US007390472B1

(12) United States Patent
Singhal et al.

(10) Patent No.: US 7,390,472 B1
(45) Date of Patent: Jun. 24, 2008

(54) METHOD OF MAKING NANOSTRUCTURED LITHIUM IRON PHOSPHATE—BASED POWDERS WITH AN OLIVINE TYPE STRUCTURE

(75) Inventors: Amit Singhal, Piscataway, NJ (US); Ganesh Skandan, Piscataway, NJ (US)

(73) Assignee: NEI Corp., Piscataway, NJ (US)

( * ) Notice: Subject to any disclaimer, the term of this patent is extended or adjusted under 35 U.S.C. 154(b) by 725 days.

(21) Appl. No.: 10/695,520

(22) Filed: Oct. 28, 2003

Related U.S. Application Data

(60) Provisional application No. 60/421,840, filed on Oct. 29, 2002.

(51) Int. Cl.
*C01B 25/26* (2006.01)

(52) U.S. Cl. ............... 423/306; 252/518.1; 252/502; 423/179.5; 429/218.1; 429/221

(58) Field of Classification Search ........ 252/500, 252/502, 518.1; 423/179.5, 306; 429/218.1, 429/221
See application file for complete search history.

(56) References Cited

U.S. PATENT DOCUMENTS 5,624,668 A * 4/1997 Lawrence et al. ........ 424/78.17

2004/0005265 A1 * 1/2004 Chiang et al. ............ 423/306
2004/0086445 A1 * 5/2004 Armand et al. ........... 423/306

FOREIGN PATENT DOCUMENTS

WO WO 02/27824 * 4/2002

OTHER PUBLICATIONS

Yamada et al. "Optimized LiFePO4 for lithium battery cathode" Journal of Electrochemical Society, 148 (3) A224-229 (2001).*
Chung et al. "Electronically conductive phosphor-olivines as lithium storage electrodes." Nature, vol. 11, Oct. 2002.*
Lawrence RJ. "Development and comparison of iron-dextran products" PDA J. of Pharm Sci Technol, vol. 52, pp. 190-197, 1998.*

\* cited by examiner

*Primary Examiner*—Mark Kopec
*Assistant Examiner*—Tri V Nguyen
(74) *Attorney, Agent, or Firm*—William L. Botjer

(57) ABSTRACT

A low cost and scalable processes for producing nanostructured $LiFe_xM_{1-x}PO_4$ and nanostructured $LiFe_xM_{1-x}PO_4/C$ composite powders, where $1 \leq x \leq 0.1$ and M is a metal cation, such as Mn, Co, Ni, and V. Electronics made of either nanostructured $LiFe_xM_{1-x}PO_4$ powders or nanostructured $LiFe_xM_{1-x}PO_4/C$ composite powders exhibit good electrochemical properties. The electronic conductivity of nanostructured $LiFe_xM_{1-x}PO_4$ powders is enhanced by intimately mixing them with ultrafine carbon particles. Thus, the use of nanostructured $LiFe_xM_{1-x}PO_4/C$ composite powders will lead to high power density, low cost and environmentally friendly rechargeable Li-ion batteries.

16 Claims, 4 Drawing Sheets

METHOD OF MAKING NANOSTRUCTURED LITHIUM IRON PHOSPHATE—BASED POWDERS WITH AN OLIVINE TYPE STRUCTURE

CROSS REFERENCE TO RELATED APPLICATIONS

This application claims priority of US provisional application no. 60/421,840 filed Oct. 29, 2002.

STATEMENT OF GOVERNMENT SUPPORT OF THE INVENTION

This work was done as part of phase I SBIR contracts from DOE and ONR under contract numbers DE-FG02-01 ER83219 and N00014-03-M-0113, respectively.

BACKGROUND OF THE INVENTION

This invention relates to the production of nanostructured (i.e., primary particles or crystalline size of less than 100 nm) lithium Iron phosphate ($LiFePO_4$)-based powders as active cathode materials in Li-ion and Li rechargeable batteries.

There is an immediate need for reliable, safe, and non-toxic rechargeable batteries with high energy density, high power density, good shelf life, and low cost, for use in electric vehicle type applications. Such batteries can also be used in other commercial applications such as, wireless communication devices, camcorders and laptop computers. Rechargeable Li-based batteries, particularly rechargeable Li-ion batteries, are becoming the system of choice because of their overall good performance and high energy density. Presently, a majority of commercial Li-ion batteries use coarse $LiCoO_2$ as cathode material; however, $LiCoO_2$ is expensive as well as toxic, which renders it unsuitable for applications, such as electric and hybrid vehicles, that require batteries to be economical and environmentally friendly, along with good performance.

$LiFePO_4$ has an ordered olivine type structure (olivine phase) and have recently been investigated as attractive cathode material because of its high theoretical capacity, 167-171 mAh/g, low cost and a lack of toxicity. FIG. 1 shows the olivine structure, where chains (along the c direction) of edge-sharing transition metal—octahedral are connected to one another by phosphate tetrahedra. These ($FePO_4$) are connected to one another by octahedrally coordinated lithium atoms along the b axis ([A. K. Padhi, K. S. Nanjundaswamy and J. B., Goodenough, *J. Electrochem. Soc.*, 144, 1188 (1977)]. Among all olivine $LiMPO_4$ compounds (M=Co, Mn, Fe, Ni and V), $LiFePO_4$ has been studied most extensively, since the demonstration by Padhi et al. that it is possible to fabricate electrochemically active $LiFePO_4$ compounds. Later on, Yamada et al. [A. Yamada, S. C. Chung and K. Hinokuma, *J. Electrochem. Soc.*, 148 (3), A224 (2001)] prepared coarse $LiFePO_4$, and showed that it is possible to achieve a capacity of ≠160 mAh/g at a low current density. This data suggests that $LiFePO_4$ cathode material has the potential to be a good candidate for Li-ion batteries. Additionally, both olivine-type materials, such as $LiCoPO_4$ and $LiMnPO_4$, are promising because they operate at higher voltage than $LiFePO_4$ and can provide higher energy density. For example, in case of $LiMnPO_4$, the redox potential for the $Mn^{3+}/Mn^{2+}$ couple is 4.1V, while it is 3.4 for $Fe^{3+}/Fe^{2+}$ couple in $LiFePO_4$. (It is to be noted that the redox potential for the $Co^{3+}/Co^{2+}$ is 4.8 V). However, it has been shown that the capacity at 4.1 V is not achieved without Fe coexisting with Mn at the octahedral 4c sites [Padhi et al. and A. Yamada, Y. Kudo, and K. -Y. Liu, *J. Electrochem. Soc.*, 148, A1153 (2001)]. Therefore, $LiFe_xM_{1-x}PO_4$ materials offer the potential of obtaining higher energy density Li-ion batteries than those using $LiFePO_4$ cathodes.

Huang et al. [H. Huang, S. -C., Yin and L. F. Nazar, *Electrochemical and Solid-State Letters*, 4 (10), A170 (2001)] synthesized nanocomposites of $LiFePO_4$ and conductive carbon by two different methods, which led to enhanced electrochemical accessibility of the Fe redox centers in this insulating material. In method A, a composite of phosphate with a carbon xerogel was formed from a resorcinol-formaldehyde precursor; in method B, surface oxidized carbon particles were used as nucleating agents for phosphate growth. They observed that electrochemical properties of powders prepared by method A were better because of the intimate contact of carbon with $LiFePO_4$ particles. The resultant $LiFePO_4$/C composite achieved 90% theoretical capacity at C/5, with good cyclability. In general, xerogels and aerogels have poor packing density, which will lead to low volumetric density of rechargeable Li-ion batteries. Chaloner-Gill et al. [U.S. Patent Publication No. US2002/0192137A1] describes the production of nanoscale and submicron particles of $LiFePO_4$ and $LiFe_{1-x}Mn_xPO_4$ ($0.4 \leqq x \leqq 0$) by a laser pyrolysis method. However, laser pyrolysis methods are relatively expensive processes, and powders produced by such processes are thus not suitable for cost conscious applications, such as electric and hybrid vehicles.

SUMMARY OF THE INVENTION

The present invention focuses on developing low cost and easily scalable processes for producing nanostructured $LiFe_xM_{1-x}PO_4$ and nanostructured $LiFe_xM_{1-x}PO_4$/C composite powders, where $1 \leqq x \leqq 0.1$ and M is a metal cation, such as Mn, Co, Ni, and V. The objective of the present invention is to provide electrodes made of either nanostructured $LiFe_xM_{1-x}PO_4$ powders or nanostructured $LiFe_xM_{1-x}PO_4$/C composite powders that exhibit good electrochemical properties. The use of nanostructured cathode materials will improve the power density of Li-ion batteries because of the small diffusion distances of Li-ions. However, lithium metal phosphates are known to have poor electronic conductivity. The electronic conductivity of nanostructured $LiFe_xM_{1-x}PO_4$ powders can be enhanced by intimately mixing them with ultrafine carbon particles. Thus, the use of nanostructured $LiFe_xM_{1-x}PO_4$/C composite powders will lead to high power density, low cost and environmentally benign rechargeable Li-ion batteries.

In the first aspect, the invention pertains to a method for producing nanoparticles of $LiFe_xM_{1-x}PO_4$. The method comprises dispersing a sugar (dextran) coated iron hydroxide particles (20-30 nm) in water, mixing it with a metal salt such as manganese salt if x<1, and reacting the mixture with a solution comprising a phosphate precursor. In a further aspect, the invention pertains to a method for intimately mixing ultrafine carbon particles with nanoparticles of $LiFe_xM_{1-x}PO_4$. The method comprises depositing carbon particles on the surface of $LiFe_xM_{1-x}PO_4$ nanoparticles from a gas stream containing a mixture of H2 and a vapor carbon source. The invention provides nanostructured $LiFe_xM_{1-x}PO_4$ particles with an average primary particle size in the range of 5-100 nm and an average secondary (aggregate) particle size in the range of 25-1000 nm.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

The process of producing nanostructured $LiFe_xM_{1-x}PO_4$ utilizes (i) commercially available Iron dextran solution (Ferrodex® 100), which is a suspension of iron hydroxide nanoparticles coated with dextran (large sugar) molecules, which forms an inert anti-agglomeration coating and also serves to control the rate of precipitation of the $LiFe_xM_{1-x}PO_4$ precursor materials since the nanoparticles are coated with dextran, they are not immediately available for the reaction. The average particle size of coated nanoparticles is in the range of 20-30 nm. (ii) a chemical precursor of cation dopants (such as, but not limited to: metal nitrate, metal carbonate, metal acetate, metal chloride, metal 2,-4 pentanedionate, metal formate, metal oxalate and metal alkoxide) or metal oxide nanoparticles (such as, but not limited to $MnO_2$, $Co_3O_4$, $NiO$, and $V_2O_5$) (iii) a lithium salt (such as, but not limited to: lithium nitrate, lithium halides, lithium carbonates, lithium hydroxide and lithium acetate, (iv) a chemical precursor of phosphate ions (such as, but not limited to ammonium hydrogen phosphate, ammonium dihydrogen phosphate, ammonium phosphate, orthophosphoric acid, lithium hydrogen phosphate, sodium hydrogen phosphate and sodium dihydrogen phosphate), and (v) water. The process is carried out at pressures in the range of 0.5 to 10 atmospheres, with a preferred range of 1 to 4 atmospheres.

In the present chemical synthesis method, an iron dextran solution, a precursor of metal cation, wherein the metal cation has an oxidation state between 2+ to 6+, such as $V^{5+}$, $Ni^{2+}$, $CO^{3+}$, $Mn^{2+}$, a lithium salt and a chemical precursor of phosphate ions are dissolved/dispersed in water. This mixture is heated above the room temperature in the range of 25-100° C. to initiate the precipitation of $LiFe_xM_{1-x}PO_4$ precursor material. It is to be noted that the rate and the extent of precipitation of the $LiFe_xM_{1-x}PO_4$ precursor material depend upon the type of phosphate precursor used. For example, the extent of precipitation in case of ammonium phosphate was much less than that of in case of ammonium dihydrogen phosphate. The solid powder is removed either by evaporating, filtering or centrifuging. The dried powder is calcined at a temperature in the range of 200-500° C. in an inert atmosphere (e.g., $N_2$, Ar) to remove volatile compounds and to avoid any oxidation of $Fe^{2+}$ into $Fe^{3+}$. The calcined powder is thereafter annealed at a relatively low temperature between 500 and 800° C. in a controlled atmosphere to achieve the appropriate crystalline phase. Once the crystallization of the olivine phase is completed, further high temperature annealing will form coarse particles by promoting sintering between particles. Therefore, the lowest possible annealing temperature needs to be utilized in order to maintain the nanostructured nature of $LiFe_xM_{1-x}PO_4$ particles.

Figure 1:
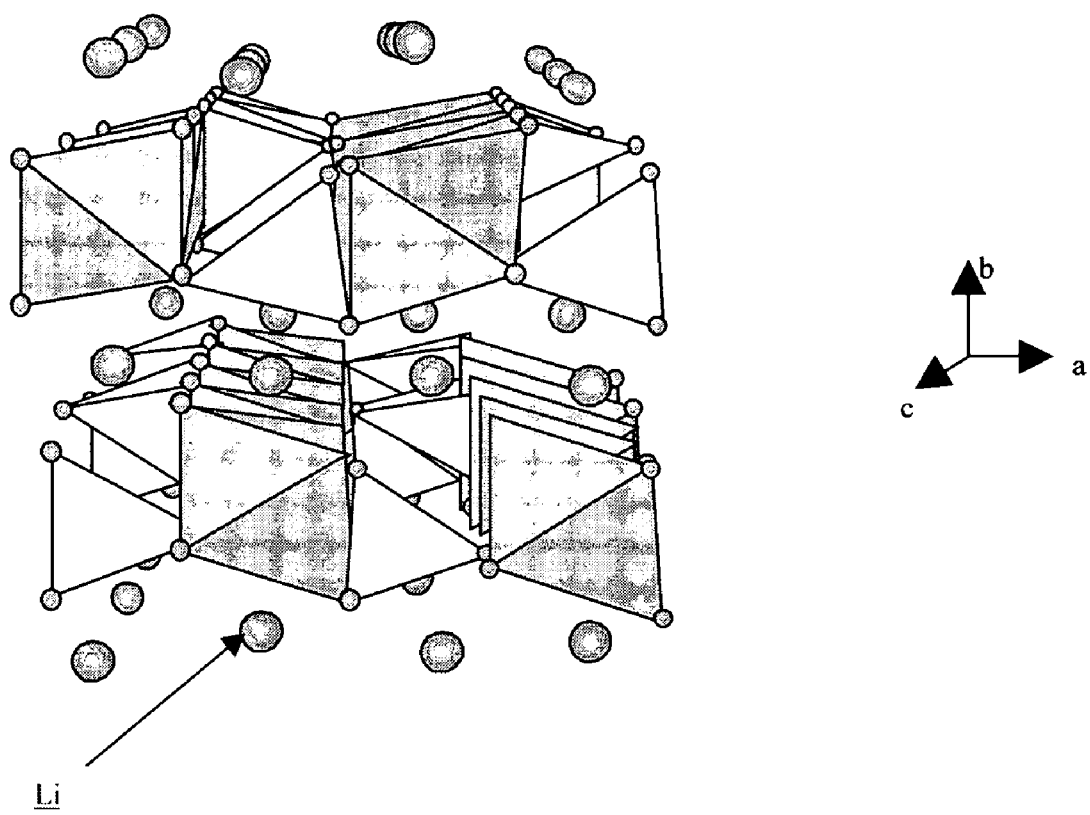
FIG. 1 is a schematic illustrating the olivine type structured of lithium metal phosphates
Figure 2:
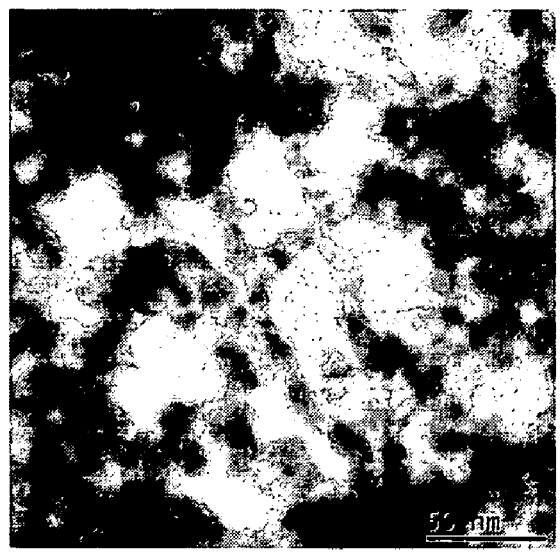
FIG. 2 is a TEM micrograph a nano-$LiFePO_4$ particle
Figure 3:
FIG. 3 is a high resolution TEM micrograph of a nano-$LiFePO_4$, demonstrating the crystalline nature of nanoparticles.

A micrograph (FIG. 2), taken by a transmission electron microscope (TEM), of a $LiFePO_4$ (x=1) clearly show the nanostructure nature of particles. The average primary particle size is in the range of 10-15 nm. Further, lattice fringes in particles demonstrate the crystalline nature of nanoparticles, see FIG. 3. $LiFePO_4$ powders show broad X-ray diffraction peaks, which also suggests the small crystalline size or primary particle size of the particles.

In the present invention, ultrafine particles of C were deposited on the surface of nano-$LiFe_xM_{1-x}PO_4$ particles by a vapor phase process. The basis of this work was that a vapor carbon source (e.g., $C_2H_2$, $CH_4$, $C_6H_6$, CO) in a reducing atmosphere can decompose to form ultrafine particles, which in turn will be intimately mixed with nano-$LiFe_xM_{1-x}PO_4$ particles to improve their electronic conductivity. The process for depositing/producing carbon particles utilizes (i) crystallized nano-$LiFe_xM_{1-x}PO_4$ particles, should as those produced by the above described process (ii) a chemical precursor of a metal (e.g., Co, Ni, Fe) catalyst (such as, but not limited to: metal nitrate, metal carbonate, metal acetate, metal chloride, metal 2,-4 pentanedionate, metal formate, metal oxalate and metal alkoxide), (iii) a gas stream containing a mixture of $H_2$ and a vapor carbon source (such as, but not limited to $C_2H_2$, $CH_4$, $C_6H_6$ and $C_2H_4$), and (iv) a solvent (water or alcohol) with a boiling point in the range of 70-230° C. The process was carried out at pressures in the range of 0.5 to 10 atmospheres, with a preferred range of 1 to 4 atmospheres.

In the synthesis method of nano-$LiFe_xM_{1-x}PO_4$/C composite powder, nano-$LiFe_xM_{1-x}PO_4$ powders were mixed with a solution of metal catalyst salt (e.g., cobalt nitrate) in water or alcohol. The solid powder is removed by evaporating the solvent. The dried powder was heat treated at a temperature in the range of 300-600° C. in pure $H_2$ to coat nanoparticles with metal catalyst (e.g., Co) by decomposing the metal salt. Subsequently, nanopowders with metal catalyst were heat treated at a temperature in the range of 400-700° C. in a mixture of $CO/H_2$ or a hydrocarbon/$H_2$ gases. The metal catalyst coated on the surface of $LiFe_xM_{1-x}PO_4$ nanoparticles promotes the intimate mixing of carbon particles with $LiFe_xM_{1-x}PO_4$ nanoparticles. Thermogravimetric analyzer data shows that as carbon particles are being deposited on nanoparticles on annealing the $LiFe_xM_{1-x}PO_4$ powder at 550° C. in a $C_2H_4H_2$ atmosphere. The amount of deposited carbon is reduced by 41% on decreasing the $C_2H_4/H_2$ ratio from 1 to 0.5. The kinetics of carbon particle deposition was found to be a function of the annealing time, the ratio of the carburizing gas and hydrogen, annealing temperature and particle characteristics of nano-$LiFe_xM_{1-x}PO_4$ powders.

Electrochemical characterization of $LiFe_xM_{1-x}PO_4$ cathodes was performed in a standard coin cell configuration. Coin cells (CR2032) were fabricated with $LiFePO_4$ cathodes (circular electrodes of 9 mm diameter and ≠8 mg mass) containing 20 wt % fine carbon (Denka Black) and 5 wt % polytetrafluoroethylene (PTFE) binder (Teflon 6-J, DUPONT-Mitsui Fluorochemical Co., Ltd), metallic lithium foil anodes, polyethylene separator (Tohnen Setera, Japan) and $LiPF_6$ in ethylene carbonate (EC/diethyl carbonate (DEC) electrolyte. Typically, coin cells were subjected to charge/discharge cycling between 2 and 4.2 V versus lithium with various current densities, if into mentioned otherwise. In general, samples are tested at a current density of 0.1 mA/$cm^2$ unless specified otherwise.

Figure 4:
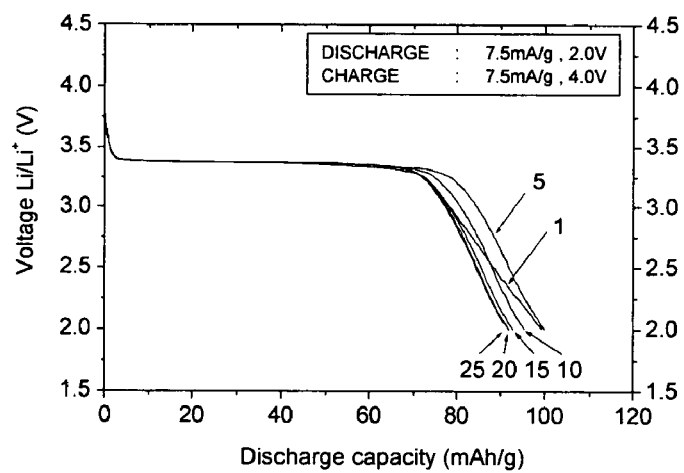
FIG. 4: shows the discharge voltage curves of a nano-$LiFePO_4$ powder as a function of electrochemical cycles.

The discharge/charge voltage curve (4.0-2.0V), FIG. 4, of a nanostructured $LiFePO_4$ powder shows a flat voltage profile at ≠3.4, which is the characteristics of $LiFePO_4$ material The first discharge capacity was ≠100 mAh/g, and the capacity of cathode made of this powder did not show any significant fade, suggesting electrochemical stability of electrodes. We also studied cathodes made of nano-$LiFePO_4$/C (preparation is explained in Example 4) and observed that depositing C particles on nano-$LiFePO_4$ powders significantly enhanced electrochemical performance of nano-$LiFePO_4$ powders. For example, nano-$LiFePO_4$/C (containing 37 wt % C) composite powder exhibited a capacity of 146 mAh/g (Note: Capacity calculations do not include the content of carbon composite powder), while cathodes made of some batch of nano-$LiFePO_4$ powder, but without C particles, has an initial capacity of 106 mAh/g and failed after 3 electrochemical cycles.

EXEMPLARY FORMULATIONS

Example 1

Nanostructured $LiFePO_4$ 16 cc (19.93 g) of an iron dextran (Ferrodex® 100) solution was mixed with 50 cc of water. In another flask, 3.46 g of $H_3PO_4$ (85 wt %) solution was mixed with 50 cc of distilled water. The Fe-dextran solution was heated to boiling. While this solution was boiling, the $H_3PO_4$ solution was added drop wise into the hot solution. After completely adding the $H_3PO_4$ solution, 25 cc of water added to dilute the solution. In another flask, 3.06 g of lithium acetate was dissolved in 50 cc of water. The lithium acetate solution was added drop wise into the hot Fe dextran/$H_3PO_4$ solution. After completely adding the lithium acetate solution, the final solution was refluxed for 7 hrs to complete the reaction. During reluxing 100 cc of water was added to the final solution. (It is to be noted that the reaction flask was kept under the nitrogen sweep to avoid the oxidation of $Fe^{2+}$ into $Fe^{3+}$). After the refluxing step, the excess water was evaporated using a rotary evaporator. The dried solid was heated in an inert atmosphere (e.g., $N_2$) at a rate of 3+ C./min. to a temperature of 350° C. for 8 hrs. The calcined powder was heat treated in a nitrogen atmosphere at a rate of 5° C./min. to a temperature of 650° C. for 8 hrs to obtain nanocrystalline $LiFePO_4$ with an olivine type structure. The surface area of this powder was in the range of 70 to 84 $m^2$/g.

Example 2

Figure 5:
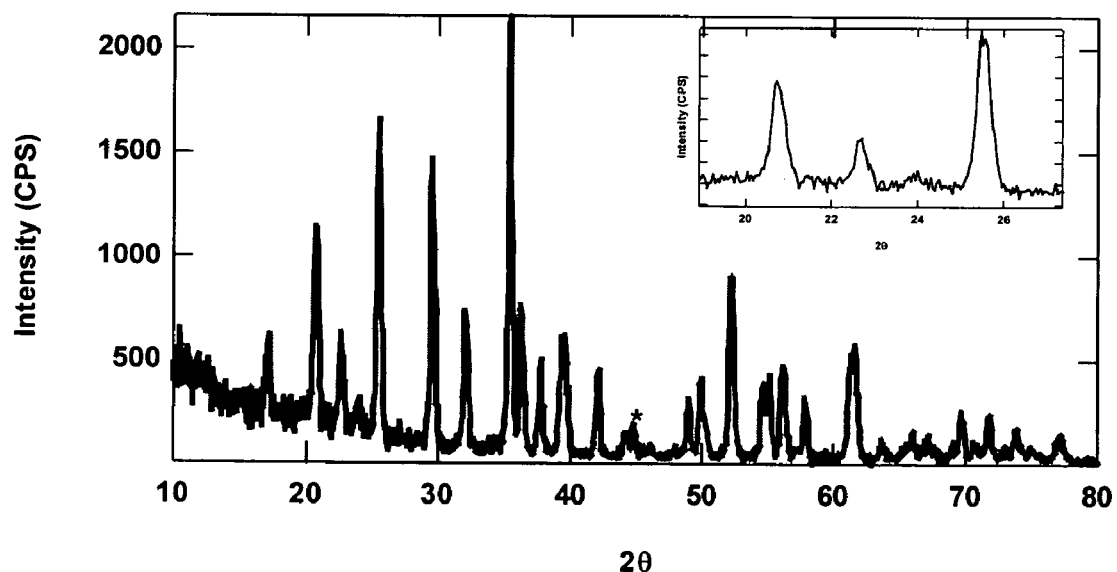
FIG. 5 shows X-ray diffraction data of nanostructured $LiMn_{0.6}Fe_{0.4}PO_4$ powder, the peak for an impurity phase is marked with an asterisk.

Nanostructured (or Ultrafine) $LiFe_{0.4}Mn_{0.6}PO_4$ 6.72 cc (7.972 g) of an iron dextrane (Ferrodex® 100) solution was mixed with 50 cc of water, and 3.06 g of lithium acetate was dissolved in the iron dextran solution. In another flask, 3.46 g of $H_3PO_4$ (85 wt %) solution was mixed with 25 cc of distilled water. The Fe-dextran/lithium acetate solution was heated to boiling. While this solution was boiling, the $H_3PO_4$ solution was added drop wise into the hot solution. In another flash, 4.4144 g of manganese acetate was dissolved in 45 cc of water. The manganese acetate solution was added drop wise into the hot Fe dextran/$H_3PO_4$/lithium acetate solution, while the solution was hot. After completely adding the manganese acetate solution, the final solution was refluxed for 4 hrs to complete the reaction. (It is to be noted that the reaction flask was kept under the nitrogen sweep to avoid the oxidation of $Fe^{2+}$ into $Fe^{3+}$). After the refluxing step, the excess water was evaporated using a rotary evaporator. The dried solid was heated in an inert atmosphere (e.g., $N_2$) at a rate of 3° C./min to a temperature of 350° C. for 8 hrs. The calcined powder was heat treated in a nitrogen atmosphere at a rate of 5° C./min. to a temperature of 650° C. for 8 hrs to obtain nanocrystalline $LiFe_{0.4}Mn_{0.6}PO_4$ with an olivine type structure. The surface area of this powder was in the range of 45 to 55 $m^2$/g. FIG. 5. shows the broad X-ray diffraction peaks (full width at half-maximum≠0.4° at 2θ=21° and 25.5°) of the olivine type structure, indicating the nanostructured nature of the $LiFe_{0.4}Mn_{0.6}PO_4$ powder. The crystalline size of particles, calculated from X-ray broadening, was in the range of 25-30 nm.

Example 3

Figure 6:
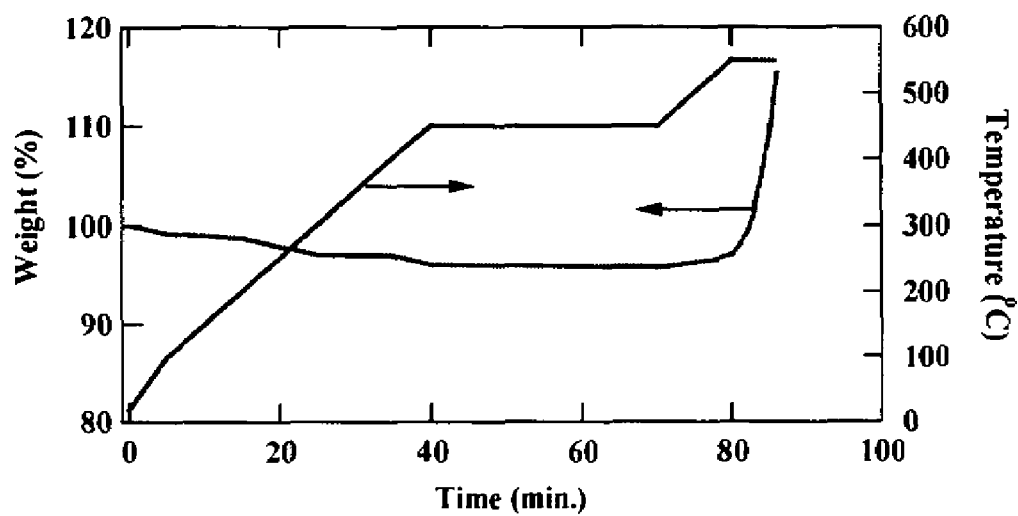
FIG. 6 shows Carbon deposition on a nano-$LiFePO_4$ powder by a $C_2H_4/H_2$ gas mixture.

Carbonization of Nano-$LiFePO_4$ Using $C_2H_4$ Gas 0.049 g of cobalt nitrate ($Co(NO_3)_3.6H_2O$) in the 20-25 cc of ethanol, and 1.0 g of nano-$LiFePO_4$ was dispersed in the ethanol/cobalt nitrate solution. After completely adding the nanopowder, the final solution was stirred for 15-20 min before evaporating the excess ethanol. The dried powder was heat treated in pure $H_2$ gas at 450° C. for 1 hr to coat nanoparticles with Co. Co coated nano-$LiFePO_4$ particles were further annealed at 550° C. for 6 min. in a $C_2H_4/H_2$ ratio of 1, there was a 15 wt % carbon deposition. At the end of reaction, the total weight gain was 24%. The amount of carbon was reduced to only 14% just be reducing the $C_2H_4/H_2$ ratio from 1 to 0.5, while keeping the total flow rate constant to 200 cc/min. FIG. 6 shows the carbon deposition on a nano-$LiFePO_4$ powder by a $C_2H_4/H_2$ gas mixture.

Example 4

Carbonization Of nano-$LiFePO_4$ Using CO Gas 0.049 g of cobalt nitrate ($Co(NO_3)_3.6H_2O$) in the 20-25 cc of ethanol, and 1.0 g of nano-$LiFePO_4$ was dispersed in the ethanol/cobalt nitrate solution. After completely adding the nanopowder, the final solution was stirred for 15-20 min before evaporating the excess ethanol. The dried powder was heat treated in pure $H_2$ gas at 450° C. for 1 hr to coat nanoparticles with Co. Co coated nano-$LiFePO_4$ particles were further annealed at 550° C. for 5 hrs. in a $CO/H_2$ ratio of 1. At the end of the reaction, there was a 37 wt % carbon deposition. While heat treating the Co coated nano-$LiFePO_4$ particles at 550° C. for 1 hr. in a $CO/H_2$ ratio of 1, there was no carbon deposition.

The present invention has been described with respect to exemplary embodiments. However, as those skilled in the art will recognize, modifications and variations in the specific details which have been described and illustrated may be resorted to without departing from the spirit and scope of the invention as defined in the appended claims.

We claim:
1. A method of producing olivine type nanostructured lithium metal phosphate of the formula, $LiFe_xM_{1-x}PO_4$, where $1 \leq x \leq 0.1$ and M is a metal cation and having an olivine structure, comprising the following steps:
   (a) dispersing iron dextran nanoparticles in a liquid solution,
   (b) at least one of the steps of: 1) dissolving a metal salt in the liquid solution and 2) dispersing metal oxide nanoparticles in the liquid solution,
   (c) dissolving a phosphate ion containing chemical precursor in the liquid solution,

(d) dissolving a lithium containing salt in the liquid solution,
(e) heating the solution to promote the precipitation of $LiFe_xM_{1-x}PO_4$ precursor material,
(f) evaporating the liquid and calcining the $LiFe_xM_{1-x}PO_4$ precursor material for removing volatiles, and
(g) annealing the $LiFe_xM_{1-x}PO_4$ precursor material to form the olivine type nanostructured $LiFe_xM_{1-x}PO_4$ compound.

2. The method as claimed in claim 1, wherein the metal salt is selected from the group consisting of: metal nitrate, metal carbonate, metal acetate, metal chloride, metal 2-4 pentanedionate, metal formate, metal oxalate and metal alkoxides.

3. The method as claimed in claim 1, wherein primary particle size of metal oxide nanoparticles is in the range of 5-100 nm, and the average secondary particle size is in the range of 25-1000 nm.

4. The method as claimed in claim 1, wherein the phosphate ion containing chemical precursor is selected from the group consisting of: ammonium hydrogen phosphate, ammonium dihydrogen phosphate, ammonium phosphate, orthophosphoric acid, lithium dihydrogen phosphate, sodium hydrogen phosphate, sodium dihydrogen phosphate, and di-(2-ethylhexyl)phosphoric acid.

5. The method as claimed in claim 1, wherein lithium salt is selected from the group consisting of lithium nitrate, lithium hydroxide, lithium carbonate, lithium chloride, lithium acetate and lithium iodide.

6. The method as claimed in claim 1, wherein the average primary particle size of iron hydroxide or iron oxide nanoparticles is in the range of 5-100 nm.

7. The method as claimed in claim 1, wherein the liquid solution is heated at a temperature in the range of 30-100° C.

8. The method as claimed in claim 1, wherein the solution is heated for a period in the range of 1-24 hrs.

9. The method as claimed in claim 1, wherein the heating step is conducted at an atmospheric pressure in the range of 0.5-10 atmosphere.

10. The method as claimed in claim 1, wherein M is selected from the group consisting of Mn, Co, Ni, and V.

11. The method as claimed in claim 1, wherein the $LiFe_xM_{1-x}PO_4$ precursor material is calcined at a temperature in the range of 200-600° C. for removing volatiles.

12. The method as claimed in claim 11, wherein the calcining takes place for a period in the range of 1-48 hrs in at least one of: an oxidizing atmosphere and an inert atmosphere.

13. The method as claimed in claim 1, wherein the calcined $LiFe_xM_{1-x}PO_4$ powder is annealed at a temperature in the range of 400-800° C.

14. The method as claimed in claim 13, wherein the calcined $LiFe_xM_{1-x}PO_4$ powder is annealed in an inert atmosphere for a period in the range of 1-48 hrs.

15. The method as claimed in claim 1, wherein the nanostructured lithium metal phosphate of the formula $LiFe_xM_{1-x}PO_4$ produced herein has a primary particle size of less than 100 nm.

16. The method as claimed in claim 1, wherein the iron dextran nanoparticles have an average particle size in the range of 20-30 nm.

* * * * *